(12) United States Patent
Lee et al.

(10) Patent No.: US 9,983,704 B2
(45) Date of Patent: May 29, 2018

(54) TOUCH PANEL

(71) Applicant: TPK Touch Solutions (Xiamen) Inc., Xiamen (CN)

(72) Inventors: Yuh-Wen Lee, Hsinchu (TW); Ho-Hsun Chi, Hsinchu (TW); Fengming Lin, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 496 days.

(21) Appl. No.: 14/656,725

(22) Filed: Mar. 13, 2015

(65) Prior Publication Data

US 2015/0261334 A1    Sep. 17, 2015

(30) Foreign Application Priority Data

Mar. 14, 2014    (CN) .......................... 2014 1 0096961

(51) Int. Cl.
*G06F 3/041*    (2006.01)
(52) U.S. Cl.
CPC .................................. *G06F 3/041* (2013.01)
(58) Field of Classification Search
CPC ....................................................... G06F 3/041
See application file for complete search history.

(56) References Cited

U.S. PATENT DOCUMENTS

| | | | | |
|---|---|---|---|---|
| 2010/0265207 A1* | 10/2010 | Chen | ...................... | G06F 3/0412 345/174 |
| 2013/0044384 A1* | 2/2013 | Kim | ......................... | B05D 5/06 359/885 |
| 2014/0092041 A1* | 4/2014 | Ih | ............................ | G06F 3/044 345/173 |
| 2014/0115878 A1* | 5/2014 | Kimura | ................... | G06F 3/044 29/622 |
| 2015/0212548 A1* | 7/2015 | Namkung | ............. | G06F 1/1652 345/174 |

* cited by examiner

*Primary Examiner* — Ariel Balaoing
(74) *Attorney, Agent, or Firm* — Cooper Legal Group, LLC (57) ABSTRACT

A touch panel includes a substrate, a masking layer, a touch circuit structure, a protective layer and a first shatterproof layer. The substrate has an upper surface and a first lateral surface disposed on the peripheral of the upper surface and extending outward from the upper surface. The masking layer is disposed on an edge of the upper surface. The touch circuit structure is disposed on the upper surface of the substrate. The protective layer covers at least the touch circuit structure and has a second lateral surface. The first shatterproof layer covers the second lateral surface and at least a part of the first lateral surface.

15 Claims, 7 Drawing Sheets

TOUCH PANEL

This non-provisional application claims priority under 35 U.S.C. § 119(a) on Patent Application No(s). 201410096961.7 filed in China on Mar. 14, 2014, the entire contents of which are hereby incorporated by reference.

BACKGROUND OF THE INVENTION

Field of the Invention

The disclosure relates to touch technology. More particularly, the disclosure relates to a touch panel.

Related Art of the Invention

In recent years, electronic devices with touch input functionality have entered the mainstream. Thus, the touch panel has become the main input device. However, a user may drop his/her portable electronic device on the ground accidentally, such that the touch panel of the portable electronic device may break. As a result, cracks may form on the touch panel, and in the worst case, the touch panel may be damaged because of the damage of the touch circuits owing to glass substrates cracking. Accordingly, it is important to reduce the risk of damages and improve the strength of the touch panels.

SUMMARY OF THE INVENTION

One aspect of the disclosure provides a touch panel which comprises a substrate, a masking layer, a touch circuit structure, a protective layer and a first shatterproof layer. The substrate has an upper surface and a first lateral surface disposed on the peripheral of the upper surface and extending outward from the upper surface. The masking layer is disposed on an edge of the upper surface. The touch circuit structure is disposed on the upper surface of the substrate. The protective layer covers at least the touch circuit structure and has a second lateral surface. The first shatterproof layer covers the second lateral surface and at least a part of the first lateral surface.

In another aspect of the disclosure provides a touch panel which comprises a substrate, a masking layer, a touch circuit structure and a first shatterproof layer. The substrate has an upper surface and a first lateral surface disposed on the peripheral of the upper surface and extending outward from the upper surface. The masking layer is disposed on an edge of the upper surface. The touch circuit structure is disposed on the upper surface. The first shatterproof layer covers the touch circuit structure, the masking layer and at least a part of the first lateral surface.

Since the touch panel comprises the first shatterproof layer, when the substrate is collided, the first shatterproof layer can absorb parts of energy. Accordingly, the energy absorbed by the substrate is reduced, and the fracture strength of the substrate of the touch panel can be improved. Additionally, even the substrate cracks, the touch circuit structure of the touch panel does not crack at the same time since the first shatterproof layer can keep the touch circuit structure intact.

BRIEF DESCRIPTION OF THE DRAWINGS

The disclosure will become more fully understood from the detailed description given herein-below and the accompanying drawings which are given by way of illustration only and thus are not limitative of the disclosure, and wherein.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
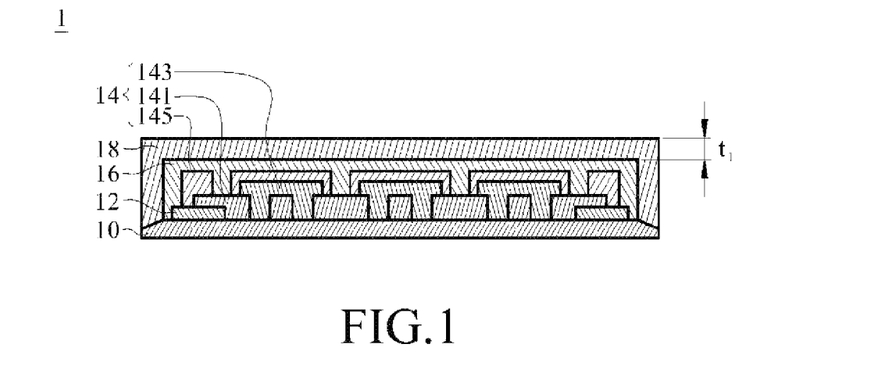
FIG. 1 is a sectional view of a touch panel according to an embodiment of the disclosure.
Figure 2:
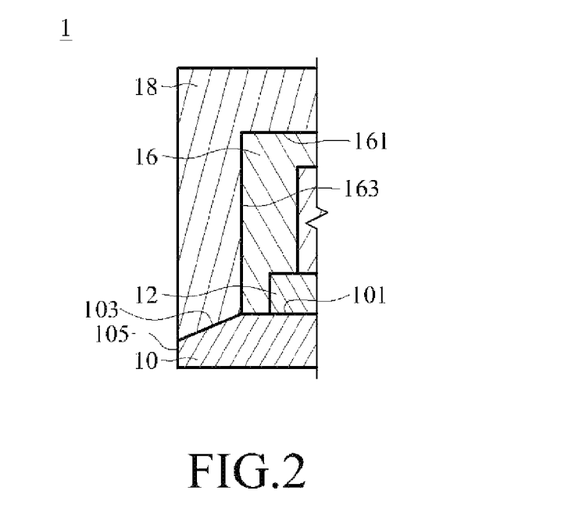
FIG. 2 is a partially sectional view of the touch panel in FIG. 1.

Please refer to FIG. 1 and FIG. 2. FIG. 1 is a sectional view of a touch panel according to one or more embodiments of the disclosure. FIG. 2 is a partially sectional view of the touch panel in FIG. 1. As shown in FIG. 1, the touch panel 1 comprises a substrate 10, a masking layer 12, a touch circuit structure 14, a protective layer 16 and a first shatterproof layer 18. Additionally, as shown in FIG. 2, the substrate 10 has an upper surface 101, a first surface 103 and a second surface 105. The first surface 103 and the second surface 105 may be considered as a first lateral surface of the substrate 10. The first lateral surface of the substrate 10 is disposed on the peripheral of the upper surface 101 and extends outward from the upper surface 101. In some embodiments, the first surface 103 is connected to the upper surface 101, and the first surface 103 and the upper surface 101 are not coplanar. Moreover, the second surface 105 is connected to first surface 103, and the first surface 103 and the second surface 105 are not coplanar, either.

In some embodiments, the substrate 10 is a glass substrate, a plastic substrate, a transparent substrate or an opaque substrate, a bendable substrate or a rigid substrate, or other substrate suitable for the touch circuit structure 14 to be disposed on.

As shown in FIG. 1 and FIG. 2, the masking layer 12, such as a black matrix resist layer, is disposed on an edge of the upper surface 101 of the substrate 10, to define a touch zone (or a display zone), which is the area surrounded by masking layer 12, of the touch panel 1 (or a touch monitor) therein. Additionally, the touch circuit structure 14 is disposed on the upper surface 101 of the substrate 10. The touch circuit structure 14 is adapted to generate one or more touch sensing signals correspondingly when the substrate 10 is touched by a user. As shown in FIG. 2, the protective layer 16 covers the touch circuit structure 14 and the masking layer 12 and has an upper surface 161 and a second lateral surface 163. Furthermore, the first shatterproof layer 18 covers the second lateral surface 161 and the first surface 103.

Furthermore, as shown in FIG. 1 and FIG. 2, the first shatterproof layer 18 covers the upper surface 161, the second lateral surface 163 of the protective layer 16 and the first surface 103 of the substrate 10. In other words, the first shatterproof layer 18 covers the protective layer 16 and at least a part of the first lateral surface of the substrate 10.

Figure 3:
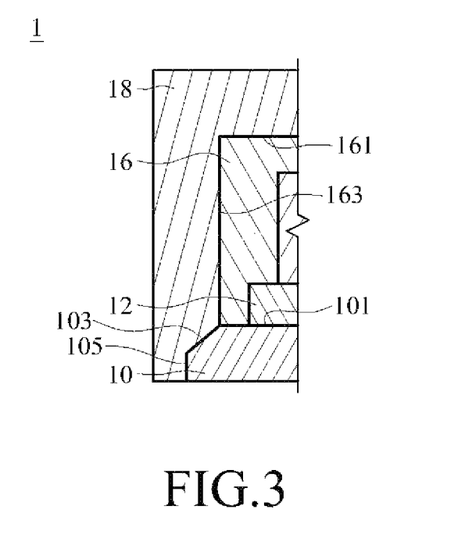
FIG. 3 is an another partially sectional view of the touch panel in FIG. 1.

Please refer to FIG. 3. FIG. 3 is another partially sectional view of the touch panel in FIG. 1. FIG. 3 is similar to FIG. 2. The difference between FIG. 3 and FIG. 2 is that the first shatterproof layer 18 covers: the upper surface 161 and the second lateral surface 163 of the protective layer 16; and the first surface 103 and the second surface 105 of the substrate 10. Accordingly, the strength at the edge of the touch panel 1 is improved. Additionally, the touch circuit structure 14 is hard to be cracked when the lateral surface of substrate 10 cracks.

Figure 4:
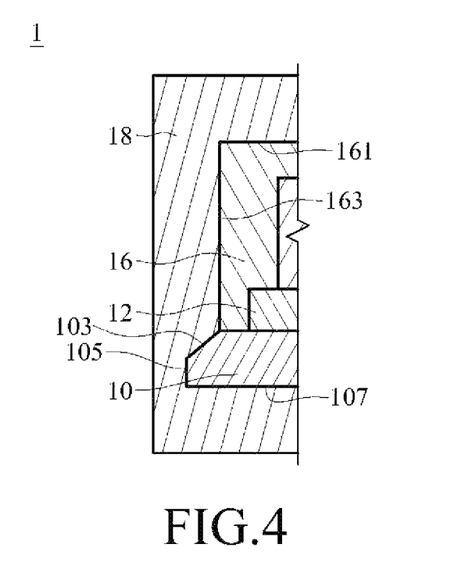
FIG. 4 is an another partially sectional view of the touch panel in FIG. 1.

Please refer to FIG. 4. FIG. 4 is another partially sectional view of the touch panel in FIG. 1. FIG. 4 is similar to FIG. 3. The difference between FIG. 4 and FIG. 3 is that the first shatterproof layer 18 further covers a lower surface 107 of the substrate 10. In other words, the first shatterproof layer 18 covers: the upper surface 161 and the second lateral surface 163 of the protective layer 16; and the first surface 103, the second surface 105, and the lower surface 107 of the substrate 10. That is to say, the external surface of the touch panel 1 is covered by the first shatterproof layer 18, for improving the strength of the lower surface 107 of the touch panel 1.

Referring again to FIG. 1, the touch circuit structure 14 comprises a plurality of transparent conductors 141, a plurality of insulators 143 and a plurality of conductive wires 145. The insulators 143 are adapted to divide the transparent conductors 141 into two or several sets. For example, the transparent conductors 141 are divided into a first set and a second set by the insulators 143. The first set of the transparent conductors 141 are not electrically connected to the second set of the transparent conductors 141 directly. The conductive wires 145 are adapted to be electrically connected to each transparent conductor 141 of the same set. The transparent conductors 141 may be directly disposed on the upper surface 101 of the substrate 10. In one or more embodiments, each insulator 143 covers one of the transparent conductors 141 in the second set, and each conductive wire 145 is connected to two or more transparent conductors 141 in the first set. In some embodiments, the conductive wires 145 are made from conductive metal films, metal oxide films, conductive polymer films, electrically conducting thin film of carbon nanotubes or other conductive materials which exhibit high light transmittance. In some embodiments, the insulators 143 are made from polystyrene (PS) or other insulating materials which exhibit high light transmittance (being pervious to light).

As shown in FIG. 1 and FIG. 2, the protective layer 16 covers the touch circuit structure 14 and the masking layer 12. Accordingly, the protective layer 16 is adapted to protect the conductive elements of the touch circuit structure, such as the transparent conductor 141 and the conductive wires 145, from oxidation or damage.

The first shatterproof layer 18 covers the protective layer 16 and at least part of the first lateral surface of the substrate 10. The compressive strength of the first shatterproof layer 18 is greater than the compressive strength of the touch circuit structure 14 and/or the substrate 10. Additionally, the Young's modulus of the first shatterproof layer 18 is less than the Young's modulus of the substrate 10. Furthermore, in some embodiments, the first shatterproof layer 18 has high light transmittance for the touch panel to display certain content. After several drop ball tests with a 120 gram steel ball, example thicknesses of the first shatterproof layer 18 and the heights causing the substrate 10 of the touch panel 1 to crack are recorded on table 1.

As shown in Table 1, when the thickness of the first shatterproof layer 18 (the thickness t1 shown in FIG. 1) is increased, the height causing the substrate 10 of the touch panel 1 to crack is increased correspondingly. Since the touch panel 1 is adapted to a touch screen, light transmittance and fracture strength of the touch panel 1 are typically both considered in design. Accordingly, in some embodiments, the thickness t1 of the first shatterproof layer 18 is between 30 microns and 120 microns. In some embodiments, the thickness of the first shatterproof layer 18 is in a range of about 70 microns to about 80 microns (such as, 70 microns, 75 microns or 80 microns). In one or more embodiments, material of the first shatterproof layer 18 is polymethylmethacrylate (PMMA), cyclic-olefin-based resin, or another material having high transparency, high strength, and low modulus.

TABLE 1

| Test No. | Thickness (microns) | Height (centimeters) |
| --- | --- | --- |
| 1 | 70 | 30 |
| 2 | 95 | 120 |
| 3 | 75 | 55 |
| 4 | 75 | 80 |
| 5 | 60 | 90 |
| 6 | 55 | 30 |
| 7 | 65 | 50 |
| 8 | 100 | 20 |
| 9 | 65 | 65 |
| 10 | 105 | 100 |
| 11 | 60 | 85 |
| 12 | 120 | 75 |
| 13 | 80 | 50 |
| 14 | 100 | 70 |
| 15 | 60 | 55 |

Figure 5:
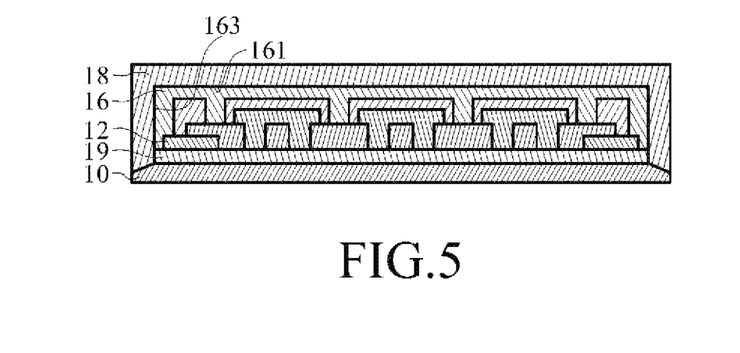
FIG. 5 is a sectional view of a touch panel according to an embodiment of the disclosure.

Please refer to FIG. 5, which is a sectional view of a touch panel in accordance with one or more embodiments of the disclosure. As shown in FIG. 5, compared to the touch panel 1 in FIG. 1, the touch panel 1 further comprises a second shatterproof layer 19 disposed between the substrate 10 and the touch circuit structure 14. In other words, the touch circuit structure 14, the protective layer 16 and the masking layer 12 are covered by the first shatterproof layer 18 and the second shatterproof layer 19. Accordingly, when the substrate 10 cracks due to an external force, the touch circuit structure 14 does not crack easily at the same time. Additionally, when only the substrate 10 cracks, and the touch circuit structure 14 and the second shatterproof layer 19 keep intact, the cracked substrate 10 can be removed from the second shatterproof layer 19 and replaced by a new substrate 10. Thus, the maintenance costs of the touch panel 1 may be reduced.

Figure 6:
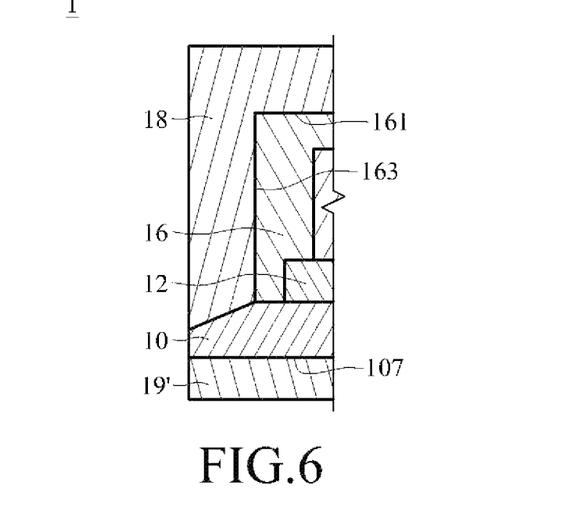
FIG. 6 is a partially sectional view of a touch panel according to an embodiment of the disclosure.

Please refer to FIG. 6 which is a partially sectional view of a touch panel according to an embodiment of the disclosure. As shown in FIG. 6, compared to the touch panel 1 in FIG. 1 and FIG. 2, the touch panel 1 further comprises a second shatterproof layer 19' which covers the lower surface 107 of the substrate 10.

Figure 7:
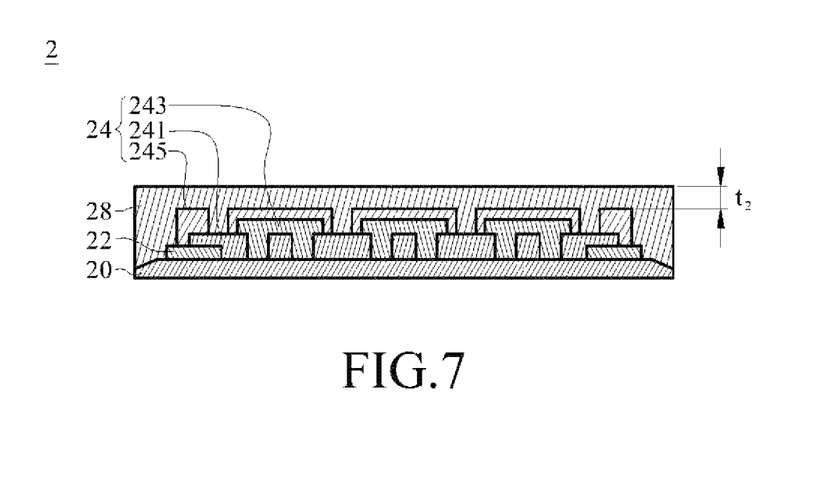
FIG. 7 is a sectional view of a touch panel according to an embodiment of the disclosure.
Figure 8:
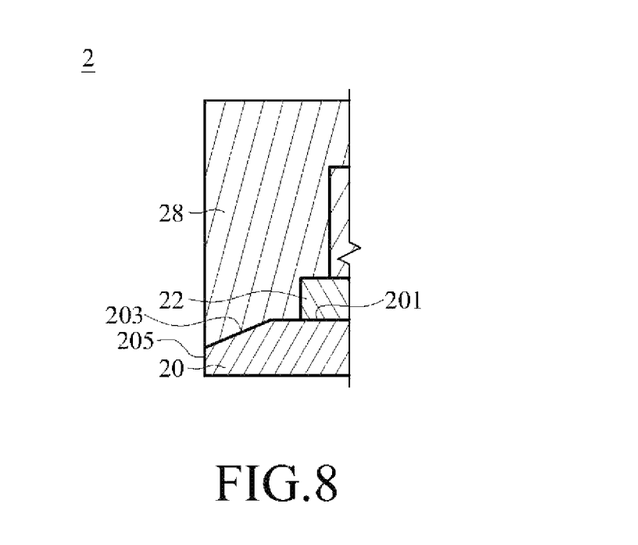
FIG. 8 is a partially sectional view of the touch panel in FIG. 7.

Please refer to FIG. 7 and FIG. 8. FIG. 7 is a sectional view of a touch panel according to one or more embodiments of the disclosure. FIG. 8 is a partially sectional view of the touch panel in FIG. 7. As shown in FIG. 7, in some embodiments, the touch panel 2 comprises a substrate 20, a masking layer 22, a touch circuit structure 24 and a first shatterproof layer 28. Additionally, as shown in FIG. 8, the substrate 20 has an upper surface 201, a first surface 203 and a second surface 205. The first surface 203 and the second surface 205 may be considered as a first lateral surface of the substrate 10 which is disposed on the peripheral of the upper surface 201 and extends outward from the upper surface 201. In some embodiments, the first surface 203 is connected to the upper surface 201, and the first surface 203 and the upper surface 201 are not coplanar. Moreover, the second surface 205 is connected to first surface 203, and the first surface 203 and the second surface 205 are not coplanar.

Compared to every touch panel 1 in FIGS. 1 through 6, the touch panel 2 does not comprise the protective layer 16. The first shatterproof layer 28 directly covers the touch circuit structure 24, the masking layer 22 and the first surface 203 of the substrate 20. In other words, the first shatterproof layer 28 covers the touch circuit structure 24, the masking layer 22 and at least a part of the first lateral surface. In some embodiments, the first shatterproof layer 28 is in direct physical contact with the touch circuit structure 24, the masking layer 22 and the first surface 203 of the substrate 20, and there is no protective layer disposed between the first shatterproof layer 28 and the touch circuit structure 24.

Figure 9:
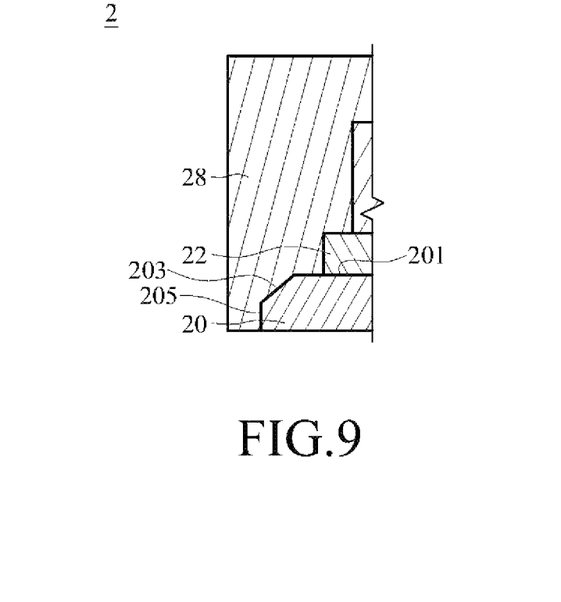
FIG. 9 is an another partially sectional view of the touch panel in FIG. 7.
Figure 10:
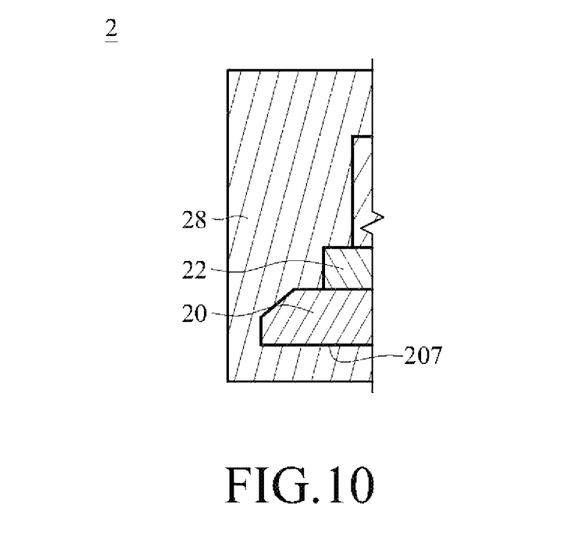
FIG. 10 is an another partially sectional view of the touch panel in FIG. 7.

The touch circuit structure 24, disposed on the upper surface 201 of the substrate 20, is adapted to generate one or more touch sensing signals correspondingly when the substrate 20 is touched by the user. Please refer to FIG. 9 which is an another partially sectional view of the touch panel in FIG. 7; FIG. 9 is similar to FIG. 8, the difference between FIG. 9 and FIG. 8 being that the first shatterproof layer 28 further covers the second surface 205 of the substrate 20. In other words, the first shatterproof layer 28 covers the touch circuit structure 24, the masking layer 22, the first surface 203 and the second surface 205. Please refer to FIG. 10 which is an another partially sectional view of the touch panel in FIG. 7; FIG. 10 is similar to FIG. 9, the difference between FIG. 10 and FIG. 9 being that the first shatterproof layer 28 further covers the lower surface 207 of the substrate 20. In other words, the first shatterproof layer 28 covers the touch circuit structure 24, the masking layer 22, the first surface 203, the second surface 205 and the lower surface 207. That is to say, the outermost layer of the touch panel 2 is covered by the first shatterproof layer 28.

The touch circuit structure 24 comprises a plurality of transparent conductors 241, a plurality of insulators 243 and a plurality of conductive wires 245. The insulators 243 are adapted to divide the transparent conductors 241 into a first set and a second set by the insulators 243. The first set of the transparent conductors 241 are not electrically connected to the second set of the transparent conductors 241 directly. The conductive wires 245 are adapted to be electrically connected to each transparent conductor 241 of the same set. The transparent conductors 241 can be directly disposed on the upper surface 201 of the substrate 20. In some embodiments, each insulator 243 covers one of the transparent conductors 241 in the second set, and each conductive wire 245 is connected to two or more transparent conductors 241 in the first set. Additionally, there are recessed areas formed between every two conductive wires 245 which are adjacent to each other, and recessed areas are filled of the first shatterproof layer 28, such that the first shatterproof layer 28 is not recessed from a top surface of the first shatterproof layer 28. In some embodiments, the transparent conductor 241 and/or the conductive wires 245 are made from conductive metal films, metal oxide films, conductive polymer films, electrically conducting thin film of carbon nanotubes or other conductive materials which exhibit high light transmittance. Moreover, the insulators 243 are made from polystyrene (PS) or other insulating materials which exhibit high light transmittance.

The compressive strength of the first shatterproof layer 28 is greater than the compressive strength of the touch circuit structure 24 and/or that of the substrate 20. Additionally, the Young's modulus of the first shatterproof layer 28 is less than the Young's modulus of the substrate 20. Furthermore, in some embodiments, the first shatterproof layer 28 needs to have high light transmittance (such as a touch panel of a touch screen). After several drop ball tests with a 120 g steel ball, the thicknesses of the first shatterproof layer 28 and the heights causing the substrate 20 of the touch panel 2 to crack are recorded on table 1.

As shown on table 1, when the thickness of the first shatterproof layer 28 (the thickness t2 shown in FIG. 7) is increased, the height causing the substrate 20 of the touch panel 2 to crack is increased correspondingly. In other words, the thickness of the first shatterproof layer 28 is positively correlated with the height causing the substrate 20 of the touch panel 2 to crack. Since the touch panel 2 is adapted to the touch screen, the features of the light transmittance and the fracture strength of the touch panel 2 shall be considered. Accordingly, in an embodiment, the thickness t2 of the first shatterproof layer 28 is between 30 microns and 120 microns. In another embodiment, the thickness t2 of the first shatterproof layer 28 is in a range of about 70 microns to about 80 microns (such as, 70 microns, 75 microns or 80 microns). Additionally, the materials of the first shatterproof layer 28 can be, but not limited to, polymethylmethacrylate (PMMA), cyclic olefin based resin, or other materials with functions of high transparency, high strength, and low modulus.

Figure 11:
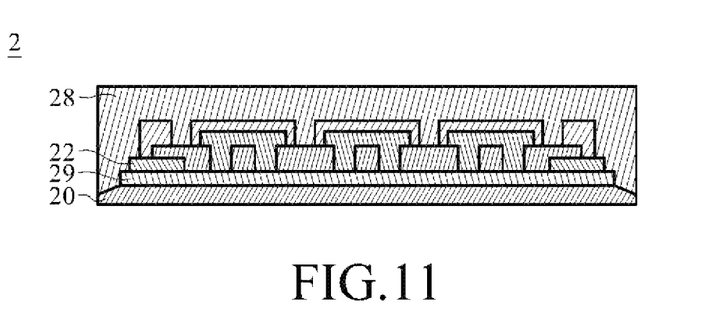
FIG. 11 is a sectional view of a touch panel according to an embodiment of the disclosure.

Please refer to FIG. 11 which is a sectional view of a touch panel according to one or more embodiments of the disclosure. As shown in FIG. 11, compared to the touch panel 2 in FIG. 7, the touch panel 2 further comprises a second shatterproof layer 29 disposed between the substrate 20 and the touch circuit structure 24. In other words, the touch circuit structure 24, and the masking layer 22 are covered by the first shatterproof layer 28 and the second shatterproof layer 29. Accordingly, when the substrate 20 cracks due to an external force, the touch circuit structure 24 does not crack easily at the same time. Additionally, when only the substrate 20 cracks, and the touch circuit structure 24 and the second shatterproof layer 29 keep intact, the cracked substrate 20 can be removed (peeled off) from the second shatterproof layer 29 and replaced by a new substrate 20. Thus, the maintenance costs of the touch panel 2 may be reduced.

Figure 12:
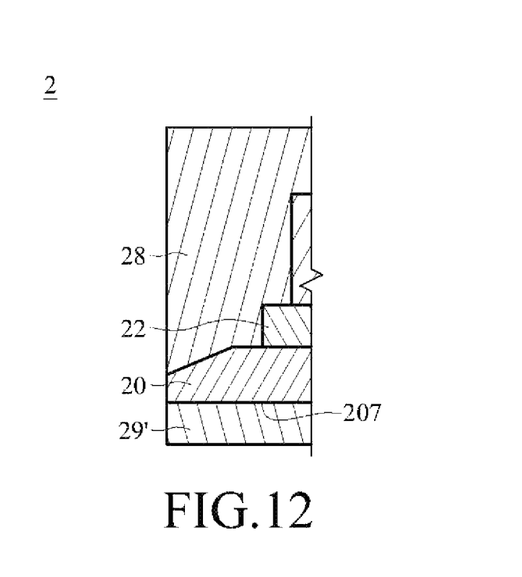
FIG. 12 is a partially sectional view of a touch panel according to an embodiment of the disclosure.

Please refer to FIG. 12 which is a partially sectional view of a touch panel according to one or more embodiments of the disclosure. As shown in FIG. 12, compared to the touch panel 2 in FIG. 7 or FIG. 8, the touch panel 2 further comprises a second shatterproof layer 29' which covers the lower surface 207 of the substrate 20.

The method of forming the first shatterproof layer and the second shatterproof layer on the said areas according to some embodiments of the disclosure is described as follows. Take PMMA for example, first, liquid (or colloidal) PMMA is coated on a predetermined area. Then, after the upper surface becomes flat, the touch panel is heated with the PMMA until the PMMA is solidified, and the first shatterproof layer and the second shatterproof layer are formed accordingly.

Figure 13:
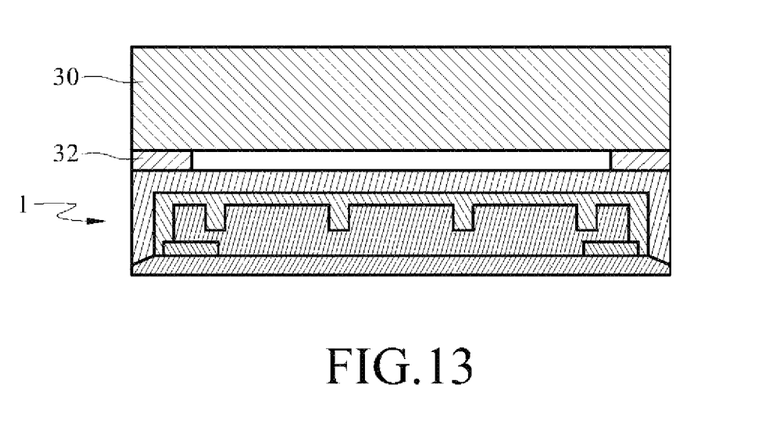
FIG. 13 is a sectional view of a touch screen according to an embodiment of the disclosure.
Figure 14:
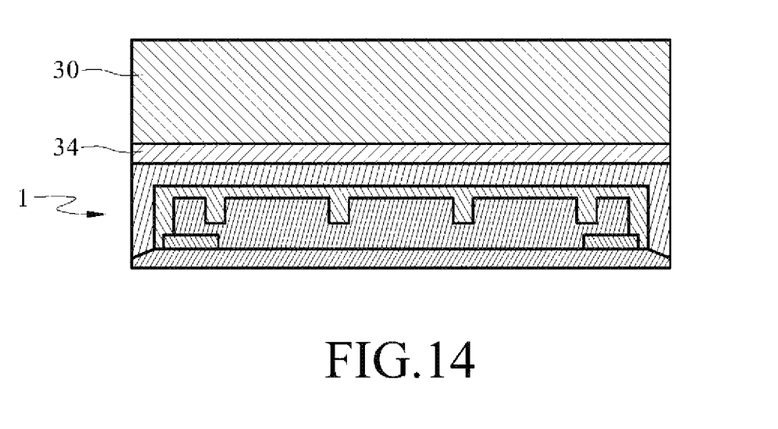
FIG. 14 is a sectional view of a touch screen according to an embodiment of the disclosure.

The method of affixing the touch panel to the display panel to form a touch screen is described as follows and shown in FIG. 13 and FIG. 14. FIG. 13 and FIG. 14 are sectional views of a touch screen according to an embodiment of the disclosure. Take the touch panel 1 for example and refer to FIG. 13, the touch screen comprises the display panel 30 and the touch panel 1. A glue 32, pasted with the edge of the touch panel 1, is adapted to attach the display panel 30 to the touch panel 1. This method is called as "air bonding"

In some other embodiments, as shown in FIG. 14, the touch screen also comprises the display panel 30 and the touch panel 1. A glue 34, pasted with two surfaces of the touch panel 1 and the display panel 30 which are adhered to each other, is adapted to attach the display panel 30 to the touch panel 1. This method is called as "direct bonding". In an embodiment, without the glue 34, the liquid PMMA is coated on the protective layer 16 of the touch panel 1 and adhered to the display panel 30. Then, the whole touch screen is heated until the PMMA is solidified.

According to embodiments of the disclosure, since the touch panel further comprises the first shatterproof layer, when the substrate is collided, the first shatterproof layer can absorb parts of energy. Accordingly, the energy absorbed by the substrate is reduced, and the fracture strength of the substrate of the touch panel can be improved. Additionally, even the substrate cracks, the touch circuit structure of the touch panel does not crack at the same time since the first shatterproof layer can keep the touch circuit structure intact. In other words, the risk of damage of the touch circuitry may be reduced when the substrate cracks. In some embodiments, since the touch panel further comprises a second shatterproof layer disposed between the substrate and the touch circuit structure, when the substrate cracks and the touch circuit structure keeps intact, the cracked substrate may be removed and replaced by a new substrate without damaging the touch circuit structure. Thus, the maintenance costs of the touch panel may be reduced.

The disclosure will become more fully understood from the said embodiment for illustration only and thus does not limit the disclosure. Any modifications within the spirit and category of the disclosure fall in the scope of the disclosure.

What is claimed is:

1. A touch panel, comprising: a substrate having an upper surface and a first lateral surface disposed on the peripheral of the upper surface and extending outward from the upper surface; a masking layer disposed on an edge region of the upper surface; a touch circuit structure disposed on the upper surface of the substrate; a protective layer covering at least the touch circuit structure and having a second lateral surface; and a first shatterproof layer covering the second lateral surface and at least a part of the first lateral surface; and wherein the first lateral surface comprises: a first surface connected to upper surface, wherein the first surface and the upper surface are not coplanar; and a second surface connected to first surface, wherein the first surface and the second surface are not coplanar; and the first shatterproof layer covers the first surface.

2. The touch panel according to claim 1, wherein a thickness of the first shatterproof layer is between 30 microns and 120 microns.

3. The touch panel according to claim 2, wherein the thickness of the first shatterproof layer is 75 microns.

4. The touch panel according to claim 1, wherein the first shatterproof layer further covers parts of the second surface.

5. The touch panel according to claim 1, wherein the substrate further has a lower surface, and the touch panel further comprises a second shatterproof layer disposed on the lower surface.

6. The touch panel according to claim 1, wherein the substrate further has a lower surface, and the first shatterproof layer further covers the lower surface.

7. The touch panel according to claim 1, further comprising a second shatterproof layer disposed between the substrate and the touch circuit structure.

8. A touch panel comprising: a substrate having an upper surface and a first lateral disposed on the peripheral of the upper surface and extending outward from the upper surface; a masking layer disposed on as edge of the upper surface; a touch circuit structure disposed on the upper surface; and a first shatterproof layer covering the touch circuit structure, the masking layer and at least a part of the first lateral surface; and wherein the first lateral surface comprises: a first surface connected to upper surface, wherein the first surface and the upper surface are not coplanar; and a second surface connected to first surface, wherein the first surface and the second surface are not coplanar; and the first shatterproof layer covers the first surface.

9. The touch panel according to claim 8, wherein a plurality of conductive wires are disposed on the upper surface, and wherein parts of the first shatterproof layer fills spaces between the plurality of conductive wires.

10. The touch panel according to claim 8, wherein a thickness of the first shatterproof layer is between 30 microns and 120 microns.

11. The touch panel according to claim 10, wherein the thickness of the first shatterproof layer is 75 microns.

12. The touch panel according to claim 8, wherein the first shatterproof layer further covers parts of the second surface.

13. The touch panel according to claim 8, wherein the substrate further has a lower surface, and the touch panel further comprises a second shatterproof layer covering the lower surface, and wherein the substrate is interposed between the first shatterproof layer and the second shatterproof layer.

14. The touch panel according to claim 8, wherein the substrate further has a lower surface, and the first shatterproof layer further covers the lower surface.

15. The touch panel according to claim 8, further comprising a second shatterproof layer disposed between the substrate and the touch circuit structure.

* * * * *